Nov. 18, 1924.                                                         1,516,208
S. P. ROCKWELL
HARDNESS TESTING MACHINE
Filed May 26, 1921                                          2 Sheets-Sheet 1

INVENTOR:
Stanley P. Rockwell.
BY
Arthur B. Jenkins.
ATTORNEY.

Nov. 18, 1924.
S. P. ROCKWELL
HARDNESS TESTING MACHINE
Filed May 26, 1921
1,516,208
2 Sheets-Sheet 2

INVENTOR:
Stanley P. Rockwell,
BY
Arthur B. Jenkins,
ATTORNEY.

Patented Nov. 18, 1924.

1,516,208

UNITED STATES PATENT OFFICE.

STANLEY P. ROCKWELL, OF WEST HARTFORD, CONNECTICUT.

HARDNESS-TESTING MACHINE.

Application filed May 26, 1921. Serial No. 472,808.

*To all whom it may concern:*

Be it known that I, STANLEY P. ROCKWELL, of West Hartford, in the county of Hartford and State of Connecticut, have invented a new and Improved Hardness-Testing Machine, of which the following is a specification.

My invention relates to that class of machines employed for testing purposes to test the hardness, more especially of metals, an object of my invention, among others, being to provide a precision machine in which extremely accurate tests may be made and especially one that shall not require a high degree of skill on the part of the operative in making such tests.

One form of machine embodying my invention, and in the construction and use of which the objects herein set out, as well as others, may be attained, is illustrated in the accompanying drawings, in which—

Figure 1:
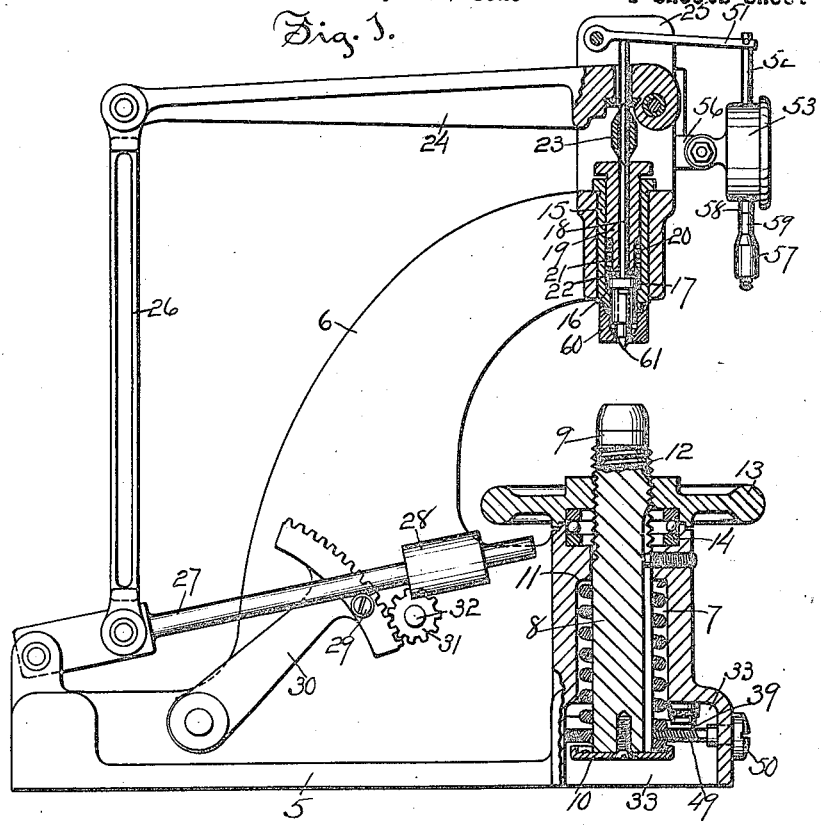
Figure 1 is a view in vertical section through my improved machine on a plane passing through the axis of the work support and testing rod.

A form of my improved machine that has been developed by me and found to work satisfactorily is illustrated in the drawings herein and comprises a frame including a base 5 and an overhanging support 6 rising from the base to support operative parts of the machine. This frame is preferably of cast metal, the base having an opening 7 extending vertically therein underneath the support 6 and containing a spindle 8 of a vertically movable work support 9. A spring support 10 is secured to the bottom end of the spindle 8 and thrusts at its upper end against a shoulder 11 formed in the wall of the opening 7 to prevent looseness of the parts. The support 9 has an elevating screw 12 at its upper end to receive an elevating wheel 13 mounted upon ball bearings 14 of any approved form interposed between the under surface of the wheel and the upper side of the base. The spindle 8 is splined to the base so that it has a vertical movement therein but no rotative movement.

A bushing 15 is secured in a hole extending through the support 6 near its upper end, this bushing having a shouldered opening extending vertically therethrough, said shoulder 16 receiving a flange on the head 17 of a testing rod 18 extending upwardly from the head through a testing sleeve 19 located within the bushing 15 and having a shoulder seated upon a spring 20 that in turn rests upon the flange hereinbefore mentioned on the head 17. The reduced end 21 of the sleeve extends within the spring 20 and to a point near the hereinbefore mentioned flange, there being a slight space 22 to be hereinafter referred to between the reduced end of the sleeve and said flange. By the above means, upon moving the work support, by turning the elevating wheel, the work is forced into testing contact with the penetrator and the minor load is applied.

All of the parts thus far referred to are illustrated and described in my copending application of Serial Number 323,094, filed September 11, 1919, and, therefore, except in connection with other members to be hereinafter described, comprise no part of my present invention.

Figure 2:
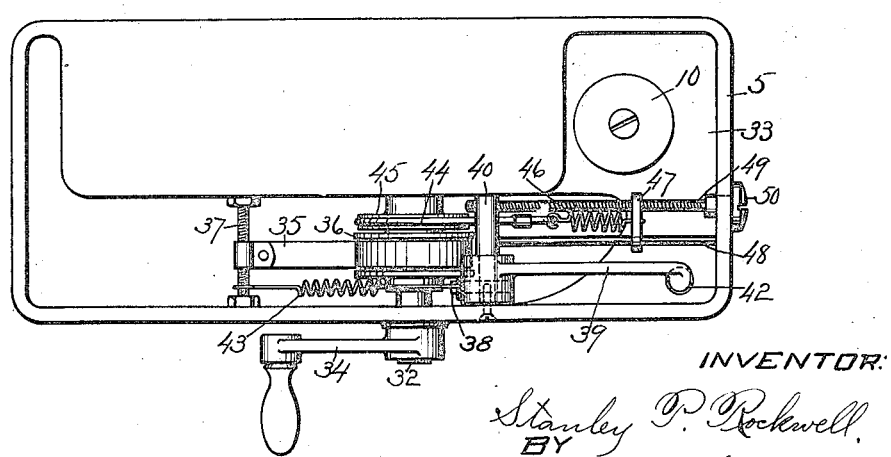
Figure 2 is a bottom view of the machine.
Figure 5:
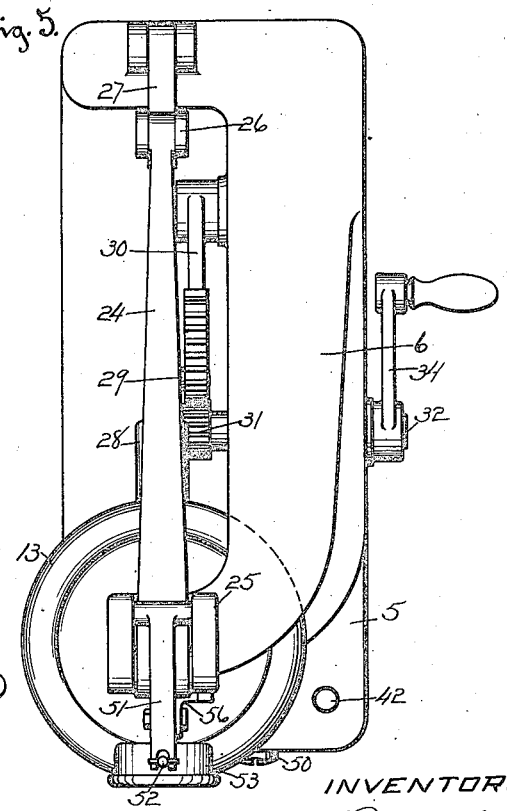
Figure 5 is a top view.

A testing block 23 is seated with its lower knife edge upon the flanged upper end of the sleeve 19, preferably in a notch therein, the upper knife edge of said block partially supporting a testing lever 24 pivotally mounted between sides 25 projecting upwardly from the upper end of the support 6, said lever extending backwardly and a connecting rod 26 connecting it with a weight beam 27 pivotally mounted on the base and supporting a testing weight 28 slidably mounted on said beam. By this means the major load is applied. This beam rests upon a supporting pin 29 projecting from the side of a weight beam supporting arm 30 pivotally attached at its lower end to the side of the frame, as shown in Figure 1 of the drawings, and having a toothed segment at its opposite end meshing with the teeth of a weight releasing pinion 31 secured to a weight releasing shaft 32 mounted in the frame and extending through a chamber 33 in the lower part thereof, a weight releasing handle 34 being secured to said shaft outside of the frame, and as shown in Figures 2 and 5 of the drawings.

Figure 3:
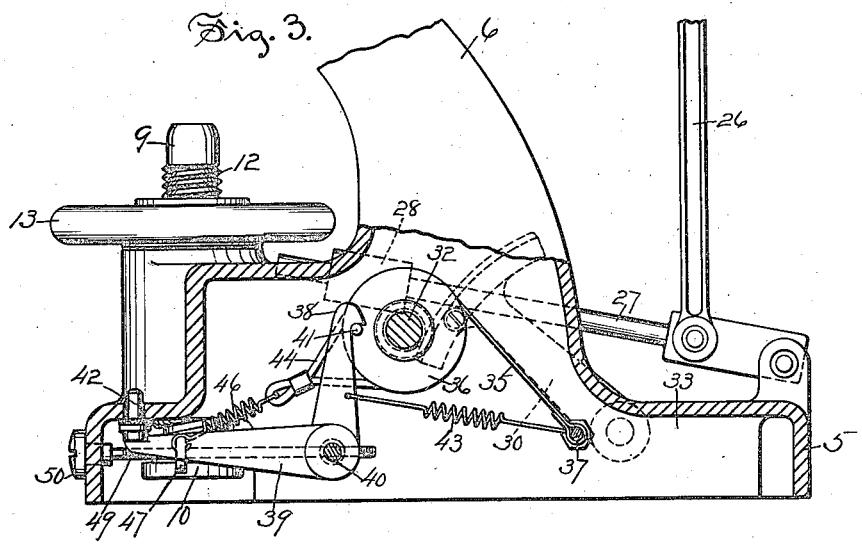
Figure 3 is a view in vertical section through the base of the machine.
Figure 4:
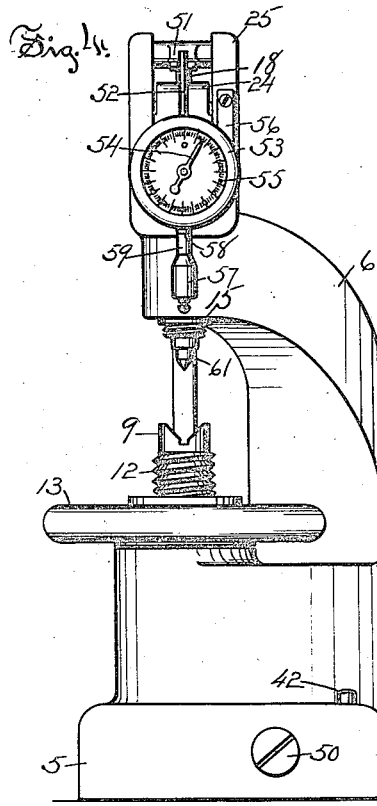
Figure 4 is a view in front elevation of the machine with the stop appurtenant to the penetrator removed.

I have found that extreme accuracy in results will be obtained if the rate of movement of the weight 28 be regulated to insure a uniform and steady application of its force, and further, if after regulating its movement the weight be permitted to effect its full influence on the piece being tested, and in order to regulate such rate of movement I have provided for the purpose a regulator comprising a motor and a member driven thereby and in operative connection with the weight beam, this regulator determining the rate of movement of the weight and also severing its connection therewith to permit the weight to act unrestrictedly at the end of its application. In the regulator shown herein I place the shaft 32 under the influence of a spring 35, as shown in Figure 3, that tends to rotate the shaft in a direction to move the pin 29 downwardly from the position shown in Figure 1, said spring being wound about a spool 36 secured to the shaft 32, the opposite end of the spring being secured to a rod 37 extending across the chamber 33. The members just described are comprised in the regulator above described, and I also provide a weight releasing and actuating mechanism, that includes a holding and releasing finger 38 and a releasing arm 39 both rotatably mounted upon a shaft 40 extending across and supported in the side parts of the chamber 33, and as shown in Figure 2 of the drawings. The finger 38 is hooked at its end to engage a releasing pin 41 projecting from the side of the spool 36 and the arm 39 has a releasing button 42 projecting upwardly therefrom through the base into a position accessible at the front of the machine, and as shown in Figure 4 of the drawings. The finger 38 is held in engagement with the pin 41 as by means of a spring 43 secured at one end to the finger and at its opposite end to the rod 37.

In order to obtain maximum results as to accuracy in the use of my improved testing device it is essential that the force of the weight 28 shall not be applied suddenly or rapidly to the article being tested, as the effects of blows resulting from sudden application or the momentum in rapid movements of the weight would indicate conditions not actually present in the articles being tested. In order to obviate such results I provide a retarder mechanism to control the speed of rotation of the spool 36 and hence the speed of downward movement of the weight beam 27, this retarder, in the structure herein shown, comprising a brake which in the structure shown consists of a retarder strap 44 wrapped about a retarder sheave 45 secured to the shaft 32. Means are provided for varying the degree of retardation. To accomplish this, the strap 44 is connected by a retarder spring 46 with a retarder tensioning plate 47 slidably mounted on a guide rod 48 mounted at one end in a wall of the chamber 33 and at its opposite end in the shaft 40. A retarder tensioning screw 49 projects from the front of the base through a wall of the chamber 33, said screw engaging a screw threaded opening in the plate 47. A slotted head 50 resting against the side of the base 5 is secured to the screw 49 as a means for turning it to regulate the tension of the spring 46 and hence the pressure exerted by the strap 44 on the shaft 32. The retarder mechanism just described provides means for not only retarding or controlling the rate of downward movement of the weight beam, but it also acts as a governor for the motor to effect a regular and steady movement thereof and prevent any sudden application of power that would result in imparting the effect of blows to the penetrator.

The testing rod 18 extends upwardly through an opening in the block 23 and through the lever 24, the upper end of said rod receiving and partially supporting an indicator actuating lever 51 pivotally mounted at one end on a pin extending between the side parts 25 and with its other and forked end receiving in grooves in the side parts of the fork a pin projecting on opposite sides of a plunger 52 of an indicator 53. The plunger is connected in any suitable manner to rotate an indicating pointer 54 acting in connection with a dial 55. The indicator is preferably pivotally attached to a bracket 56 projecting from one of the sides 25, and as shown in Figures 1 and 4 of the drawings. The plunger 52 extends through the indicator and mounts an indicating sleeve 57 secured thereto and having preferably a tapered end surrounding and acting in connection with an index mark 58 on an index member 59 projecting from the lower side of the indicator 53 and through which member the plunger 52 extends, said member and sleeve being so formed that the latter may move upwardly surrounding said member sufficiently to bring its indicating edge opposite or above the indicating mark 58. This indicating sleeve 57 is employed for the purpose of denoting a certain position of the parts at a preliminary step in the testing operation, and as hereinafter described. This affords a means for visually determining the position of the parts desired. As another means for determining such position of the parts I provide a stop 60 that is secured as by means of interengaging screw threads to the lower projecting end of the bushing 15, and as shown in Figure 1, and by means of which stop this preliminary step in the testing operation may be determined by feeling.

In the testing operation of the device an article to be tested is placed upon the work support 9 and the elevating wheel 13 is rotated to carry the article upwardly against a penetrator 61 secured in the lower end of the head 17, and the rotation of the wheel 13 is continued until the upper edge of the indicating sleeve 57 registers with the index mark 58, or, when the stop 60 is used the article is carried upwardly until it is pressed against the stop 60 with sufficient force to denote to the operator that such condition exists. Under these conditions the minor load has been applied. With the parts thus positioned the flange on the head 17 is carried away from the shoulder 16 and is also in a position spaced from the lower end of the testing sleeve 19, it being essential that when the weight 28 is released for downward movement the head 17 or the flange thereon shall be located in the space 22 and clear from any obstruction, and shall continue in this space and clear from any obstruction during the entire testing operation. Up to this point the operation constitutes the application of a minor load, and the force of the spring 20 is consequently exerted to break through the outer shell of the article being tested and to bring the penetrator 61 into contact with the true metal underneath said shell under action of the minor load. The dial 55 may now be turned to register the zero graduation thereon with the indicating pointer. The button 42 being now pressed downwardly the finger 38 will be released from the pin 41, this permitting the spool 36 to be rotated under the influence of the spring 35 and the weight. The weight, through its lever mechanism, applies the major load. In this movement the retarder 44 acts to prevent sudden application and rapid movement of the weight, but permitting said weight to exert its full force upon the article being tested when the pin 29 is moved out of contact with the weight beam 27. When the movement of the weight ceases, thus terminating the application of a major load the position of the indicating hand on the dial will denote the degree of entrance of the penetrator into the article being tested, as well as the distortion of the article owing to its elasticity and the "spring" of the parts comprising the machine. The weight being now returned to its starting position, as by turning the handle 34, the indicating hand will travel backwardly to a certain point that will indicate the degree of entrance of the penetrator into the article being tested and the indicator will, therefore, by direct reading now indicate the degree of hardness of said article, and, owing to the absence of rapidity of movement, shock, or jar, the results thus obtained will be of the highest order.

In the operation of this device when the finger 38 releases the spool 36 the spring 35 exerts its force upon the spool 36 to turn it and consequently to rotate the arm 30. When the weight 28 has descended to its fullest extent independent action of the spring 35 will withdraw the pin on the arm 30 from contact with the weight beam 27, thus permitting the weight to exert its full force upon the article being tested.

In accordance with the provisions of the patent statutes, I have described the principles of operation of my invention, together with the device which I now consider to represent the best embodiment thereof; but I desire to have it understood that the device shown is only illustrative, and that the invention may be carried out by other means.

I claim :—

1. A hardness testing machine comprising a work supporting member and a penetrator member movable one toward the other so as to bring the work and penetrator into contact, means actuated by the movement of one of said members for applying force to one of said members so as to subject the work to a minor load, means for applying a major load to one of said members, and means for regulating the application of said major load during different tests so as to secure a uniform application of its force.

2. A hardness testing machine comprising a work supporting member and a penetrator member movable one toward the other, means actuated by the movement of the work supporting member for applying a minor load to the penetrator, means for applying a major load to said penetrator, means for withholding said major load applying means, and a motor operatively connected with said withholding means for controlling movement thereof.

3. A hardness testing machine comprising a work supporting member and a penetrator member movable one toward the other, means controlled by the movement of the work supporting member to apply a minor load to said penetrator, means for applying a major load to said penetrator, and means for controlling the rate of movement of the major load applying means.

4. A hardness testing machine comprising a work supporting member and a penetrator member movable one toward the other, means for applying a minor load to said penetrator, means including a weight for moving one of said members toward the other for testing, and means for retarding movement of said weight during the application of its power to test said article.

5. A hardness testing machine comprising a work supporting member and a penetrator member movable one toward the other, means for applying a minor load to the work on the work supporting member, means for moving one of said members toward the other for applying a major load to said work, a pivotally mounted arm operatively connected with said moving means, and means for retarding the movement of said arm during the application of power to test said article.

6. A hardness testing machine comprising a work supporting member and a penetrator member movable one toward the other, means for applying a minor load to the work, means for applying a major load to one of said members to subject said article to a testing operation, means including a rotating shaft operatively connected with said major load applying means, and means for retarding movement of said shaft.

7. A hardness testing machine comprising a work supporting member and a penetrator member movable one toward the other, means for applying a minor load to the work, means for moving one of said members toward the other thereby applying a major load to the work, holding means to prevent operation of said moving means, means for releasing said holding means, and means for regulating movement of said moving means.

8. A hardness testing machine comprising a work supporting member and a penetrator member movable one toward the other, means for applying a major load to one of said members for testing, means including a rotating member to prevent application of said load, a member to hold said rotating member against rotation, and means for releasing said holding member.

9. A hardness testing machine comprising a work supporting member and a penetrator member movable one toward the other, means for applying a major load to one of said members for testing, a rotatably mounted shaft operatively connected with said load applying means to affect application of said power, means for rotating said shaft in one direction, means for retarding movement of said shaft, and means for rotating said shaft in the opposite direction.

10. A hardness testing machine comprising a work supporting member and a penetrator member movable one toward the other, means for applying a major load to one of said members for testing, a pivotally mounted arm operatively connected with said load applying means, a rotatably mounted shaft operatively connected with said arm, means for rotating said shaft in one direction, means for retarding its movement, and means for manually rotating said shaft in the opposite direction.

11. A hardness testing machine comprising a work supporting member and a penetrator member movable one toward the other, means for applying a minor load to one of said members, means for applying a major load to one of said members, and means for governing the speed of application of said major load.

12. A hardness testing machine comprising a work supporting member and a penetrator member movable one toward the other, means for applying force to one of said members for testing purposes, means for controlling the speed of application of such force applying means, and means for disconnecting said controlling means from the force applying means after the penetrator member has been forced against the work so as to permit free application of such force unaffected by said means for controlling the speed of application of the force.

13. A hardness testing machine comprising a work supporting member and a penetrator member movable one toward the other, means movably mounted to apply force to one of said members to press said penetrator against a piece of work, and means movably mounted to control the rate of movement of said force applying means, said controlling means being movable so as to disconnect it from the force applying means after the penetrator has been forced against a piece of work.

14. A hardness testing machine comprising a work supporting member and a penetrator member movable one toward the other, means controlled by the movement of the work supporting member for applying a minor load, means for applying a major load to one of said members, and means for retarding the movement of said major load applying means.

15. A hardness testing machine comprising a work supporting member and a penetrator member movable one toward the other, means controlled by the movement of the work supporting member for applying a minor load to the penetrator, means for applying a major load to one of said members, means for retarding the movement of said major load applying means, and means for varying the degree of retardation.

16. A hardness testing machine comprising a work supporting member and a penetrator member movable one toward the other so as to bring a piece of work on the work supporting member and the penetrator into contact, means for applying a major load to one of said members for testing purposes, and a brake for retarding the rate of application of said major load.

17. A hardness testing machine comprising a work supporting member and a penetrator member movable one toward the other so as to bring a piece of work on the work supporting member and the penetrator into contact, means for applying a load to one of said members, braking means for retarding the movement of said load, said braking means being disconnected from the load after the penetrator member has been forced against the work.

18. A hardness testing machine comprising a work supporting member and a penetrator member movable one toward the other so as to bring a piece of work on the work supporting member and the penetrator into contact, means for applying a load to one of said members, a motor to control the rate of application of said load, and a brake to retard the movement of said motor.

STANLEY P. ROCKWELL.